United States Patent
Kiriaki et al.

(10) Patent No.: US 11,872,618 B2
(45) Date of Patent: Jan. 16, 2024

(54) FLOATING CUTTER UNIT AND TRIMMING PRESS PROCESSING DEVICE

(71) Applicant: OILES CORPORATION, Tokyo (JP)

(72) Inventors: Hideki Kiriaki, Fujisawa (JP); Junichi Tanahashi, Fujisawa (JP); Satoshi Abe, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 272 days.

(21) Appl. No.: 16/971,514

(22) PCT Filed: Feb. 13, 2019

(86) PCT No.: PCT/JP2019/005114
§ 371 (c)(1),
(2) Date: Aug. 20, 2020

(87) PCT Pub. No.: WO2019/163606
PCT Pub. Date: Aug. 29, 2019

(65) Prior Publication Data
US 2021/0260642 A1   Aug. 26, 2021

(30) Foreign Application Priority Data
Feb. 22, 2018 (JP) .................... 2018-030165

(51) Int. Cl.
*B21D 28/14*   (2006.01)
*B21D 37/10*   (2006.01)

(52) U.S. Cl.
CPC ............. *B21D 28/14* (2013.01); *B21D 37/10* (2013.01)

(58) Field of Classification Search
CPC ................................ B21D 37/10; B21D 28/14
(Continued)

(56) References Cited

U.S. PATENT DOCUMENTS 8,291,739 B2 * 10/2012 Aramizu .................. B26F 1/40
83/656
2010/0139355 A1   6/2010 Aramizu et al.
(Continued)

FOREIGN PATENT DOCUMENTS

CN   200951486 Y   9/2007
CN   101767143 A   7/2010
(Continued)

OTHER PUBLICATIONS

International Search Report for PCT/JP2019/005114 dated Apr. 23, 2019, 5 pages.
(Continued)

*Primary Examiner* — Evan H Macfarlane
*Assistant Examiner* — Liang Dong
(74) *Attorney, Agent, or Firm* — Nixon & Vanderhye P.C.

(57) ABSTRACT

The present invention makes it possible to obtain a fine finish along a trim line in a plate material while preventing scoring between a floating cutter and a main trimming press upper. A floating cutter unit is provided with: a floating cutter for cutting scrap from a plate-shaped material, said floating cutter being attached to and used in a trimming press processing device that cuts scrap from a plate material along a trim line Tr and that additionally cuts scrap along a scrap cut line Sc; a holder set for holding the floating cutter so as to be movable in the direction of an axial center O; a spring that is brought into contact with the tail end surface of the floating cutter and that applies reaction force to the floating cutter; and a pair of cutters that are attached to the holder set and positioned on both sides of the floating cutter along the trim line Tr.

16 Claims, 13 Drawing Sheets

(58) Field of Classification Search
USPC .................................................. 83/681, 656
See application file for complete search history.

(56) References Cited

U.S. PATENT DOCUMENTS

2010/0199739 A1    8/2010  Thaddaeus
2016/0038989 A1*   2/2016  Wu ........................ B21D 22/02
                                                      72/356

FOREIGN PATENT DOCUMENTS

| CN | 102962312 A   | 3/2013  |
| CN | 103611837 A   | 3/2014  |
| CN | 104959735 A   | 10/2015 |
| EP | 2 098 311 A1  | 9/2009  |
| EP | 2 098 311 B1  | 4/2014  |
| JP | 7-256355      | 10/1995 |
| JP | 10-29020      | 2/1998  |
| JP | 2008-126304   | 6/2008  |
| JP | 2009-262175   | 11/2009 |
| JP | 2012-240109   | 12/2012 |
| WO | 2013/171795 A1| 11/2013 |

OTHER PUBLICATIONS

Chinese Search Report dated Feb. 8, 2022 in Chinese Application No. 201980014624.X with English translation (5 pages).
Extended European Search Report dated Oct. 8, 2021 issued in European Application No. 19757245.6 (7 pages).
Extended European Search Report dated Oct. 11, 2021 issued in European Application No. 19757599.6 (7 pages).
International Search Report for PCT/JP2019/005173 dated Apr. 23, 2019, 4 pages.
Chinese Search Report dated Apr. 7, 2022 issued in Chinese Application No. 201880086201.4 with English translation (4 pages).
Office Action dated Jul. 14, 2023 issued in Korean Application No. 10-2020-7026839 with English translation (13 pages).
Office Action dated Jul. 19, 2023 issued in Korean Application No. 10-2020-707026840 with English translation (13 pages).

* cited by examiner

Fig.2
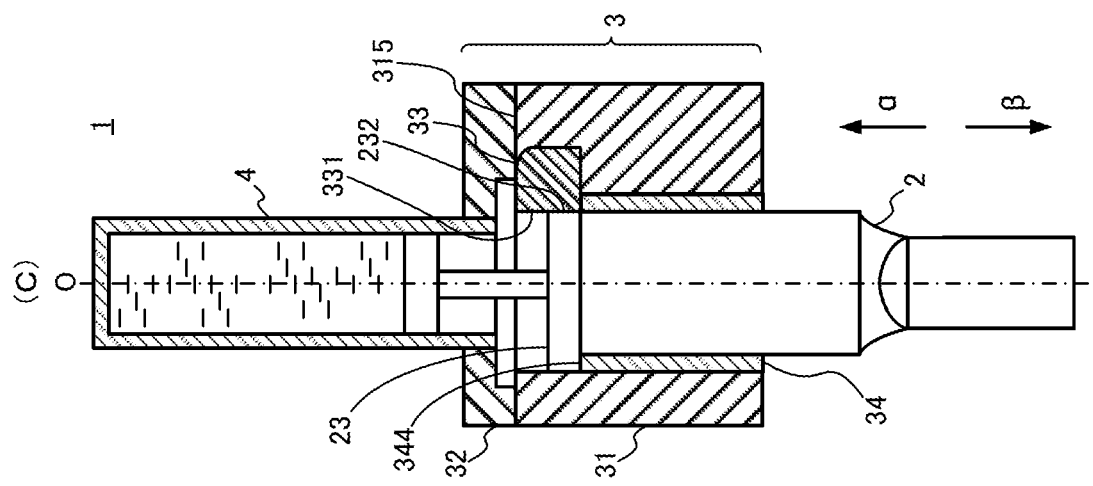
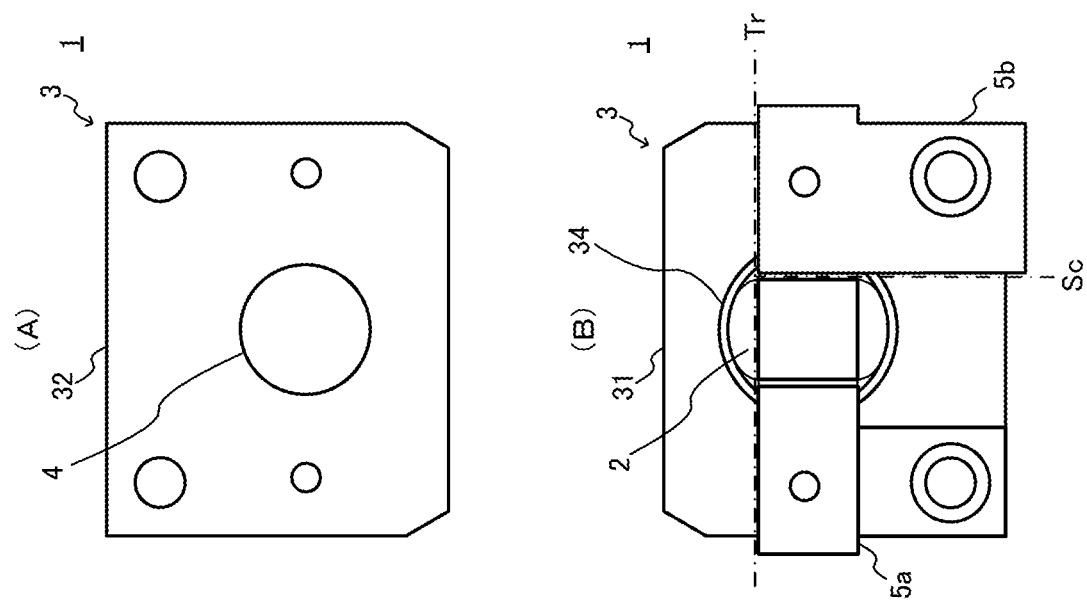

Fig.4
(A)
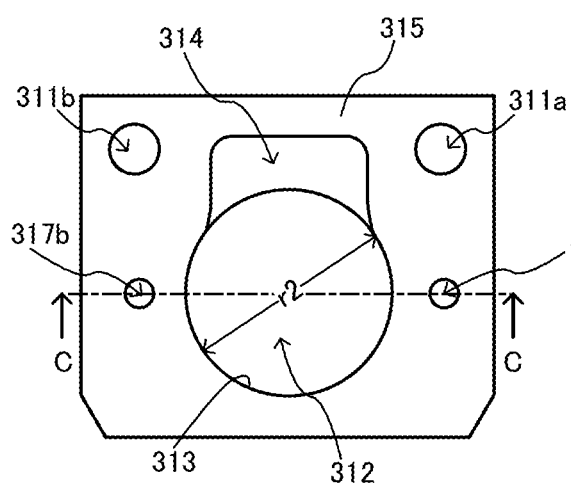
(B)
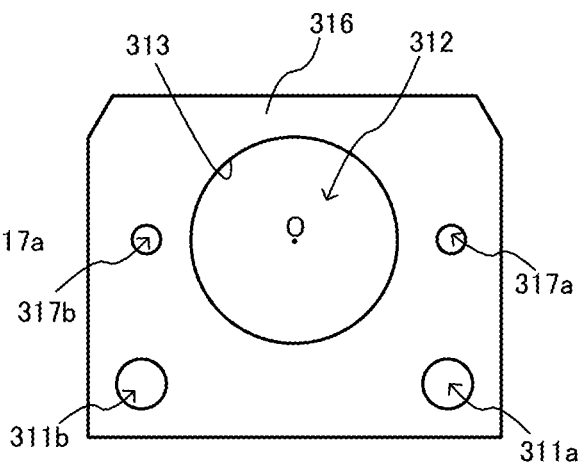
(C)
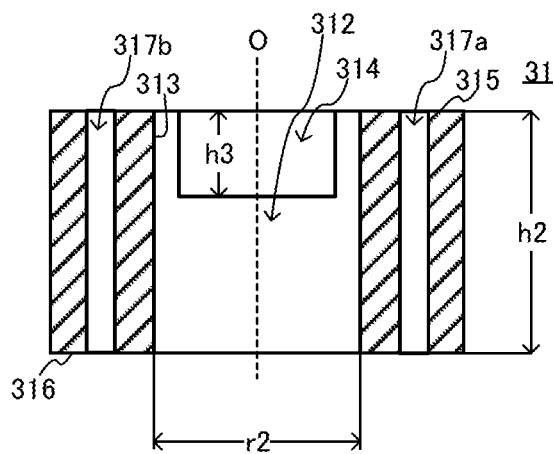

Fig.5
(A)　　　　　　　(B)　　　　　　　(C)
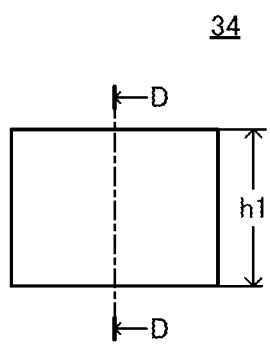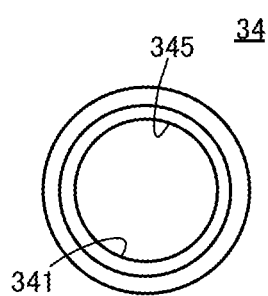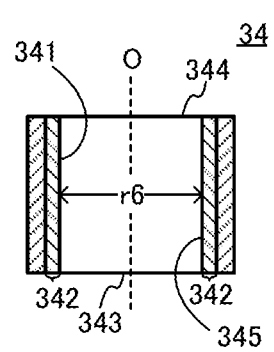

Fig.6
(A) 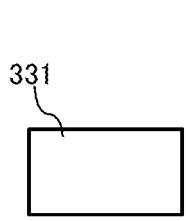
(B) 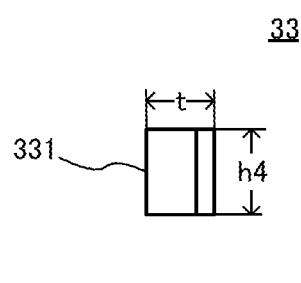
(C) 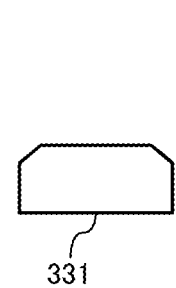

Fig.7
(A)
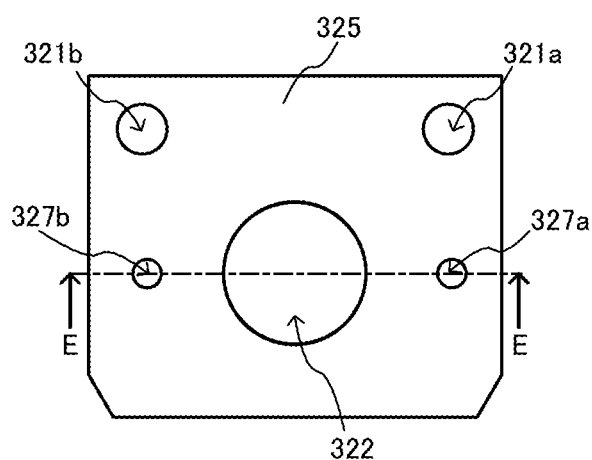
(B)
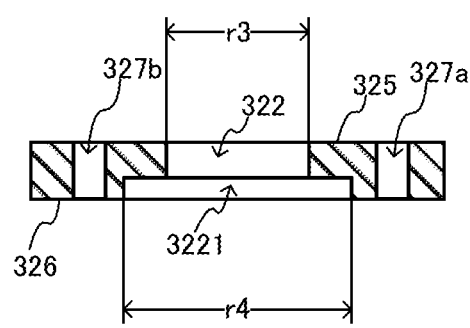

Fig.8
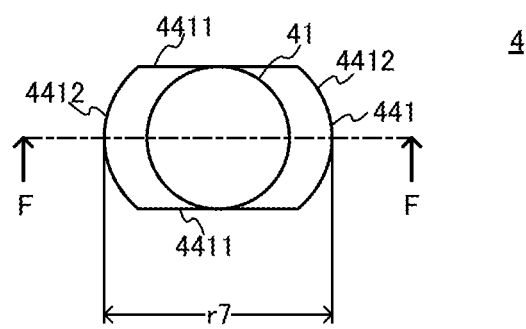
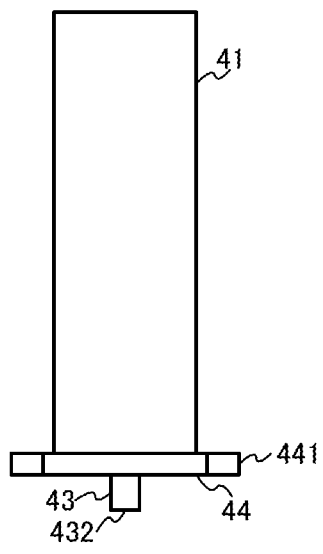
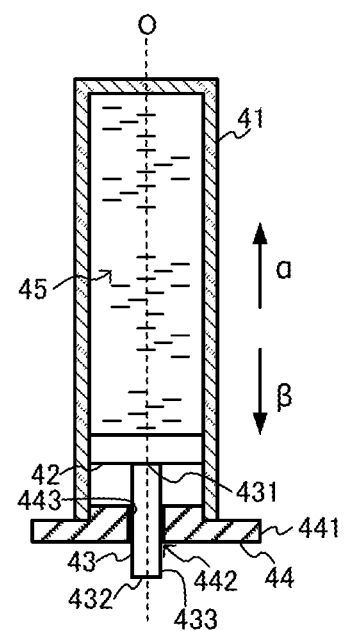

Fig.13
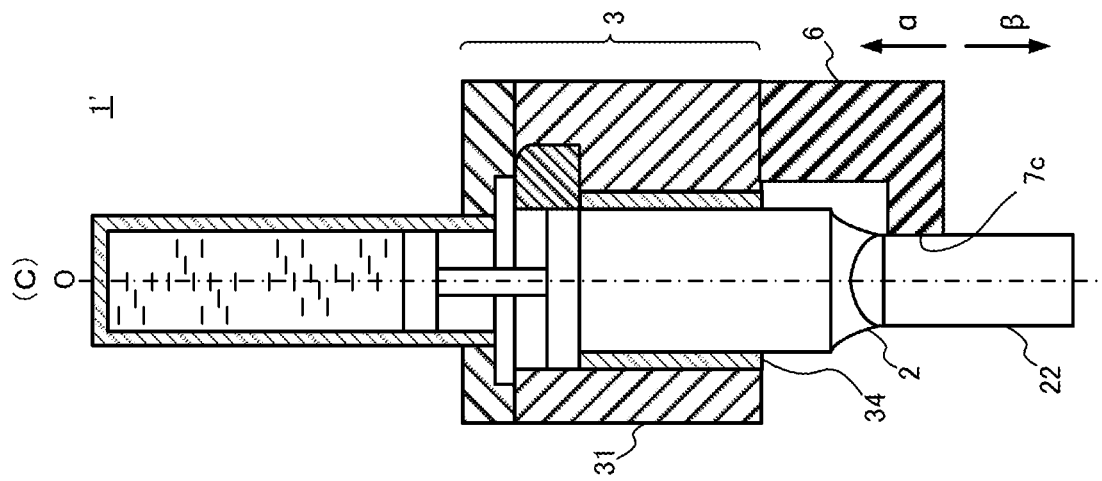
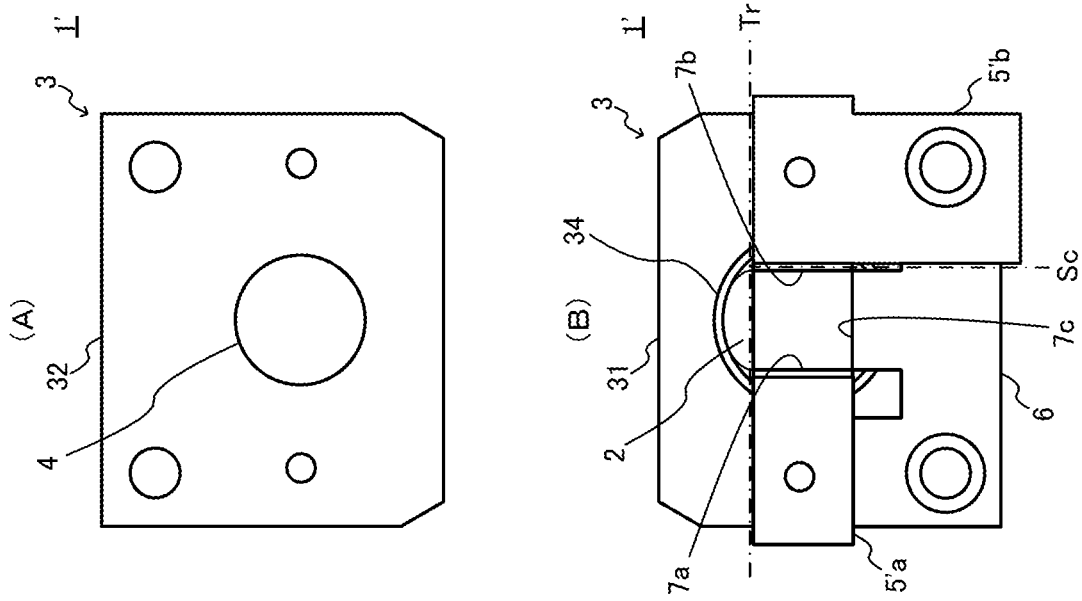

FLOATING CUTTER UNIT AND TRIMMING PRESS PROCESSING DEVICE

This application is the U.S. national phase of International Application No. PCT/JP2019/005114 filed Feb. 13, 2019 which designated the U.S. and claims priority to JP Patent Application No. 2018-030165 filed Feb. 22, 2018, the entire contents of each of which are hereby incorporated by reference.

TECHNICAL FIELD

The present invention relates to a floating cutter unit provided with a floating cutter that is used as a sub trimming press upper die of a trimming press processing device.

BACKGROUND ART

Usually, a trimming press processing device that can divide a scrap arising from trimming is provided with trimming press upper and lower dies having cutting teeth for cutting off a scrap other than a product part from a plate material along a trimming line and in addition scrap cutting press upper and lower dies having cutting teeth for dividing the cut-off scrap further along a scrap cut line. Among the trimming press upper and lower dies, the trimming press upper die comprises a main trimming press upper die and a sub trimming press upper die. The main trimming press upper die moves up and down in relation to the trimming press lower die that is stationary, and the sub trimming press upper die moves synchronously or asynchronously with the main trimming press upper die depending on the situations.

The processing process by the trimming press processing device comprises two steps: a trimming processing step (first step), in which the trimming press upper and lower dies cut off the scrap; and a scrap dividing step (second step), in which the scrap cutting press upper and lower dies divide the scrap further.

In the first step, the sub trimming press upper die moves down together with the main trimming press upper die, and holds the plate material between the main trimming press upper die together with the sub trimming press upper die and the trimming press lower die, to cut off the scrap other than the product part from the plate material along a trim line. Thereafter, in the second step, the sub trimming press upper die that further moves down together with the main trimming press upper die comes in contact with the scrap on the scrap cutting press lower die, to press against the scrap with a constant load and maintain that state, and then moves up in relation to the main trimming press upper die. The scrap cutting press upper die moves down together with the main trimming press upper die. When the sub trimming press upper die relatively moves up after cutting-off of the scrap other than the product part, the scrap cutting press upper die continues pressing against the scrap with a constant load, holds the scrap between the scrap cutting press upper die and the scrap press lower die, and divides the scrap along the scrap cut line.

The Patent Literature 1 discloses a floating cutter unit provided with a floating cutter that is used as a sub trimming press upper die.

This floating cutter unit comprises: a floating cutter; a holder set, which holds the floating cutter movably in the direction of the axial center; and a spring, which is in contact with a tail end surface of the floating cutter and gives reaction force to the floating cutter.

The holder set comprises: a cutter holder, in which a through-hole for inserting the floating cutter is formed; a bush, which is fitted in the through-hole of the cutter holder and has an inner peripheral surface that comes in sliding contact with the outer peripheral surface of the floating cutter; and a spring holder, in which a through-hole for inserting the spring is formed coaxially with the through-hole of the cutter holder.

The spring prevents by reaction force the floating cutter from moving up in relation to the main trimming press upper die at the time when the trimming press upper and lower dies cut off a scrap. On the other hand, after cutting-off of the scrap, the spring allows the floating cutter to move up in relation to the main trimming press upper die at the time when the floating cutter comes in contact with the scrap cutting press lower die and is pressed against by the scrap cutting press lower die.

CITATION LIST

Patent Literature

Patent Literature 1: Japanese Unexamined Patent Application Laid-Open No. 2012-240109

SUMMARY OF INVENTION

Technical Problem

In the floating cutter unit described in the Patent Literature 1, the floating cutter, as a sub trimming press upper die, forms a cutting tooth along a trim line together with the main trimming press upper die. Accordingly, in order to finish fine the cut surface of the plate material along the trim line, it is desired that the gap between the floating cutter and the main trimming press upper die should be as narrow as possible. However, if the gap between the floating cutter and the main trimming press upper die is set too narrow, owing to an error in the mounting position of the main trimming press upper die and the floating cutter unit to the trimming press processing device, the floating cutter and the main trimming press upper die strongly press against each other. By this, moving up and down of the floating cutter relative to the main trimming press upper die may cause scoring and scatter iron wear debris.

The present invention has been made taking the above situation into consideration, and an object of the present invention is to provide a floating cutter and a trimming press processing device that can obtain a fine finish along a trim line in a plate material while preventing scoring between a floating cutter and a main trimming press upper die.

Solution to Problem

To solve the above problem, in a floating cutter unit of the present invention, a pair of cutters, which are positioned on both sides of a floating cutter along a trim line, are attached to a holder set, which holds the floating cutter movably in the direction of the axial center.

For example, the present invention provides a floating cutter unit used being attached to a trimming press processing device that cuts a scrap from a plate material along a trim line and divide the scrap further along a scrap cut line, comprising:

a floating cutter, which cuts the scrap from the plate material;

a holder set, which holds the floating cutter movably in a direction of an axial center of the floating cutter;

a spring, which is in contact with a tail end surface of the floating cutter so as to give reaction force to the floating cutter; and a pair of cutters, which are attached to the holder set and are positioned on both sides of the floating cutter along the trim line.

Further, the present invention provides a trimming press processing device, comprising:

a trimming press lower die;

a main trimming press upper die, which moves toward the trimming press lower die and cuts off a scrap other than a product part from a plate material between the main trimming press upper die and the trimming press lower die along a trim line;

the above-described floating cutter unit, which moves together with the main trimming press upper die toward the trimming press lower die, and cuts off the scrap from the plate material together with the main trimming press upper die between the trimming press lower die and the floating cutter unit together with the main trimming press upper die;

a scrap cutting press lower die, which is positioned with a space from a cutting edge of the trimming press lower die at a distance corresponding to a plate thickness of the plate material in a direction of moving of the main trimming press upper die; and a scrap cutting press upper die, which moves together with the main trimming press upper die and divides the scrap along a scrap cut line between the scrap cutting press upper die and the scrap cutting press lower die;

wherein, in the floating cutter unit, when the floating cutter that has cut off the scrap is pressed against the scrap cutting lower die, the floating cutter is moved relative in a reverse direction to the direction of moving of the main trimming press upper die against to the holder set by compression of the spring.

Advantageous Effects of Invention

In the present invention, the pair of cutters, which are positioned on both sides of the floating cutter along the trim line, are attached to the holder set, which holds the floating cutter movably in the direction of the axial center. By this, a gap between the floating cutter and the pair of cutters is not influenced by an error in the mounting position of the main trimming press upper die and the floating cutter unit to the trimming press processing device. Thus, it is possible to set the gap (including zero gap) between the floating cutter and the pair of cutters with a high degree of accuracy. Further, since the pair of cutters are attached to the holder set, the pair of cutters do not move in a direction of an axial center of the floating cutter in relation to the main trimming press upper die. By this, scoring between the pair of cutters and the main trimming press upper die does not occur. Therefore, according to the present invention, it is possible to obtain a fine finish along the trim line in the plate material while preventing scoring between the floating cutter unit and the main trimming press upper die.

Further, in the present invention, a material different from the material for the main trimming press upper die can be selected as the material for the pair of cutters. By this, compared to the material of the main trimming press upper die, by selecting a high hardness metal, which has high resistance to metal contact with the floating cutter, as the material of the pair of cutters, the gap between the floating cutter and the pair of cutters can be set narrower (including zero gap). Therefore, it is possible to obtain a more fine finish along the trim line in the plate material while preventing scoring between the floating cutter unit and the main trimming press upper die.

BRIEF DESCRIPTION OF DRAWINGS

FIGS. 2(A) and 2(B) are respectively a top view and a bottom view of the floating cutter unit 1 according to the one embodiment of the present invention, and FIG. 2(C) is an A-A cross-section view of the floating cutter unit 1 shown in FIG. 1(B);

FIGS. 4(A) and 4(B) are respectively a top view and a bottom view of a cutter holder 31, FIG. 4(C) is a C-C cross-section view of the cutter holder 31 shown in FIG. 4(A);

FIGS. 5(A) and 5(B) are respectively a front view and a top view of a bush 34, and FIG. 5(C) is a D-D cross-section view of the bush 34 shown in FIG. 5(A);

FIGS. 6(A), 6(B), and 6(C) are respectively a front view, a side view, and a top view of a rotation lock 33;

FIG. 7(A) is a top view of a spring holder 32, and FIG. 7(B) is an E-E cross-section view of the spring holder 32 shown in FIG. 7(A);

FIGS. 8(A) and 8(B) are respectively a top view and a front view of a spring 4, and FIG. 8(C) is an F-F cross-section view of the spring 4 shown in FIG. 8(A);

FIGS. 13(A) and 13(B) are respectively a top view and a bottom view of the floating cutter unit 1' as the variation of the floating cutter unit 1 of the one embodiment of the present invention, and FIG. 13(C) is a G-G cross-section view of the floating cutter unit 1' as the variation of the floating cutter unit 1 shown in FIG. 12(B).

DESCRIPTION OF EMBODIMENTS

Figure 1:
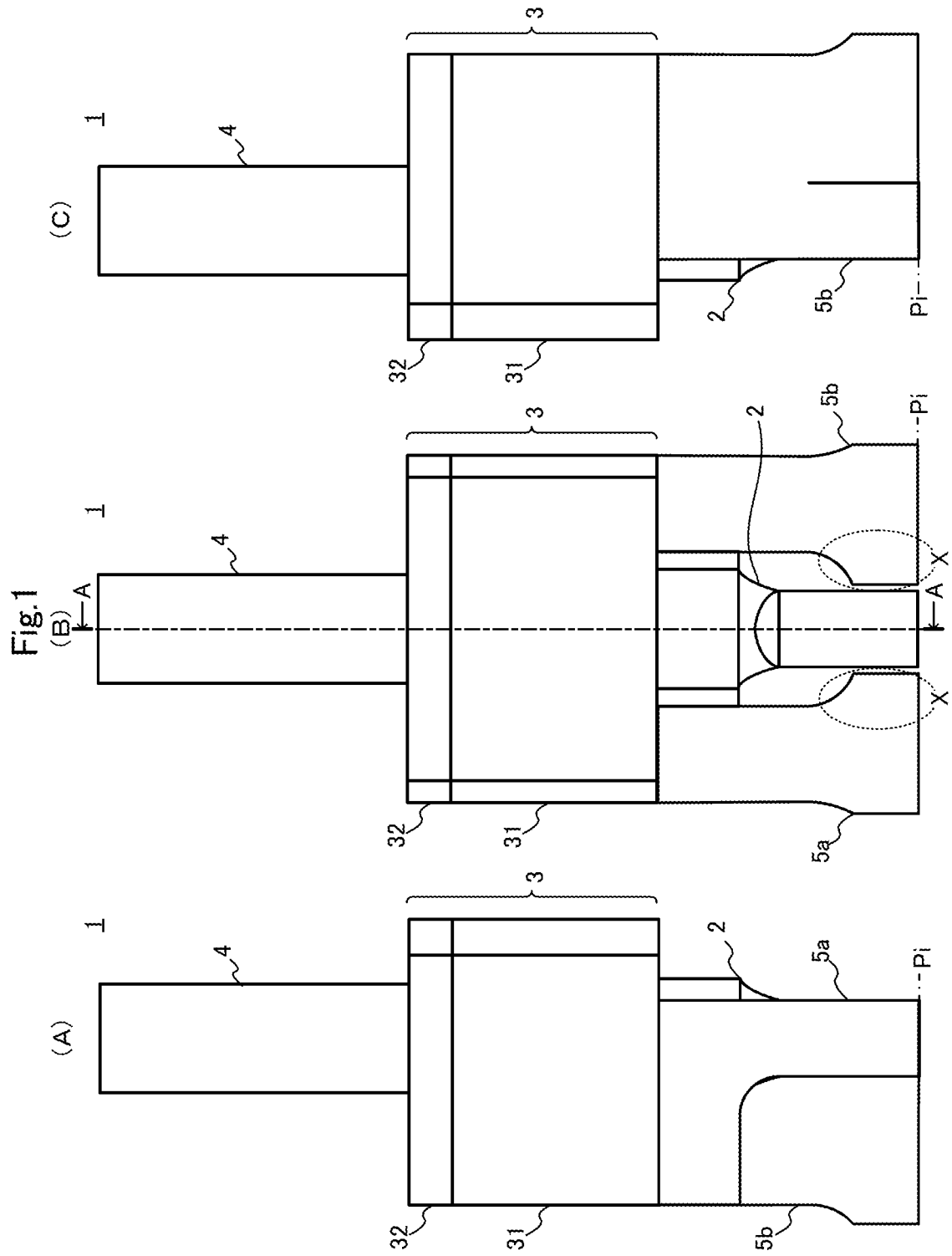
FIGS. 1(A), 1(B), and 1(C) are respectively a left side view, a front view, and a right side view of a floating cutter unit 1 according to one embodiment of the present invention.

In the following, one embodiment of the present invention will be described referring to the drawings.

A floating cutter unit 1 according to the present embodiment is used in a trimming press processing device, and is attached to an upper die attachment plate that moves up and down interlocking with a ram, when a scrap other than a product part is cut off and separated from a plate material along a trim line Tr and thereafter the scrap is divided along a scrap cut line Sc.

FIGS. 1(A), 1(B), and 1(C) are respectively a left side view, a front view, and a right side view of the floating cutter unit 1 of the present embodiment. Further, FIGS. 2(A) and 2(B) are respectively a top view and a bottom view of the floating cutter unit 1 of the present embodiment, and FIG. 2(C) is an A-A cross-section view of the floating cutter unit 1 shown in FIG. 1(B).

As shown in the figures, the floating cutter unit 1 of the present embodiment comprises: a floating cutter 2; a holder set 3, which holds the floating cutter 2 movably in the direction of the axial center O ($\alpha$ direction and $\beta$ direction); a tubular spring 4, which limits upward movement (in the $\alpha$ direction) of the floating cutter 2 in relation to the holder set 3; a pair of cutters 5a and 5b, which are attached to the holder set 3 so as to be positioned both side of the floating cutter 2 along the trim line Tr; and, although not shown, fixing bolts for fixing the floating cutter unit 1 to the upper die attachment plate of the trimming press processing device.

Further, the holder set 3 comprises: a cutter holder 31, which holds the floating cutter 2 movably in the direction of the axial center O; a spring holder 32, which is superposed on one end surface (a surface on the side of the upper die attachment plate of the trimming press processing device: hereinafter referred to as the upper surface) 315 of the cutter holder 31 on the side of the a direction, so as to hold the spring 4 coaxially with the floating cutter 2 held by the cutter holder 31; a rotation lock 33 for preventing rotation of the floating cutter 2 in relation to the holder set 3; and a cylindrical bush 34, which is fitted into the cutter holder 31 and into which the floating cutter 2 is inserted.

Figure 3:
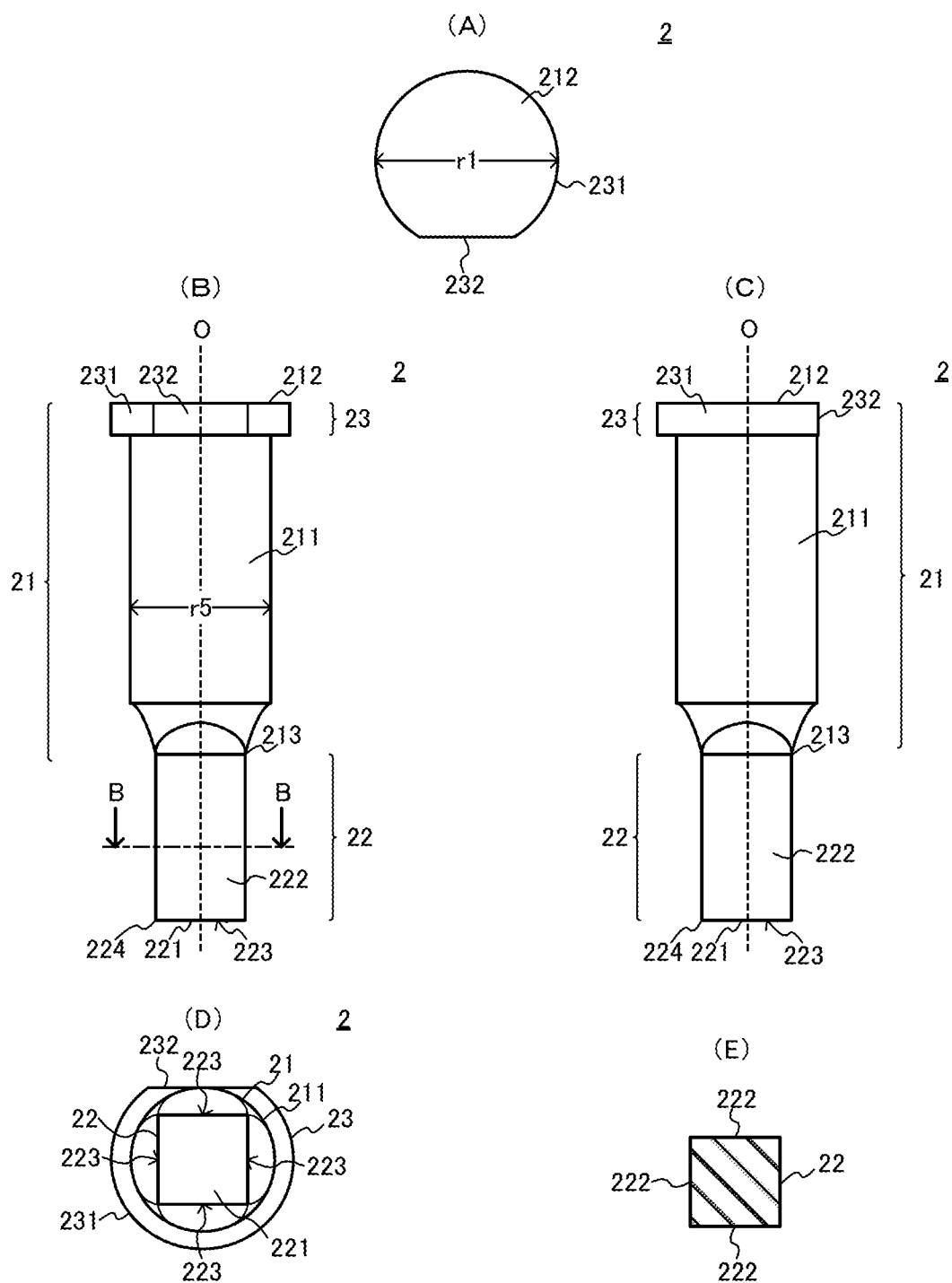
FIGS. 3(A)-3(D) are respectively a top view, a front view, a side view, and a bottom view of a floating cutter 2.
FIG. 3(E) is a B-B cross-section view of the floating cutter 2 shown in FIG. 3(B)
Figure 9:
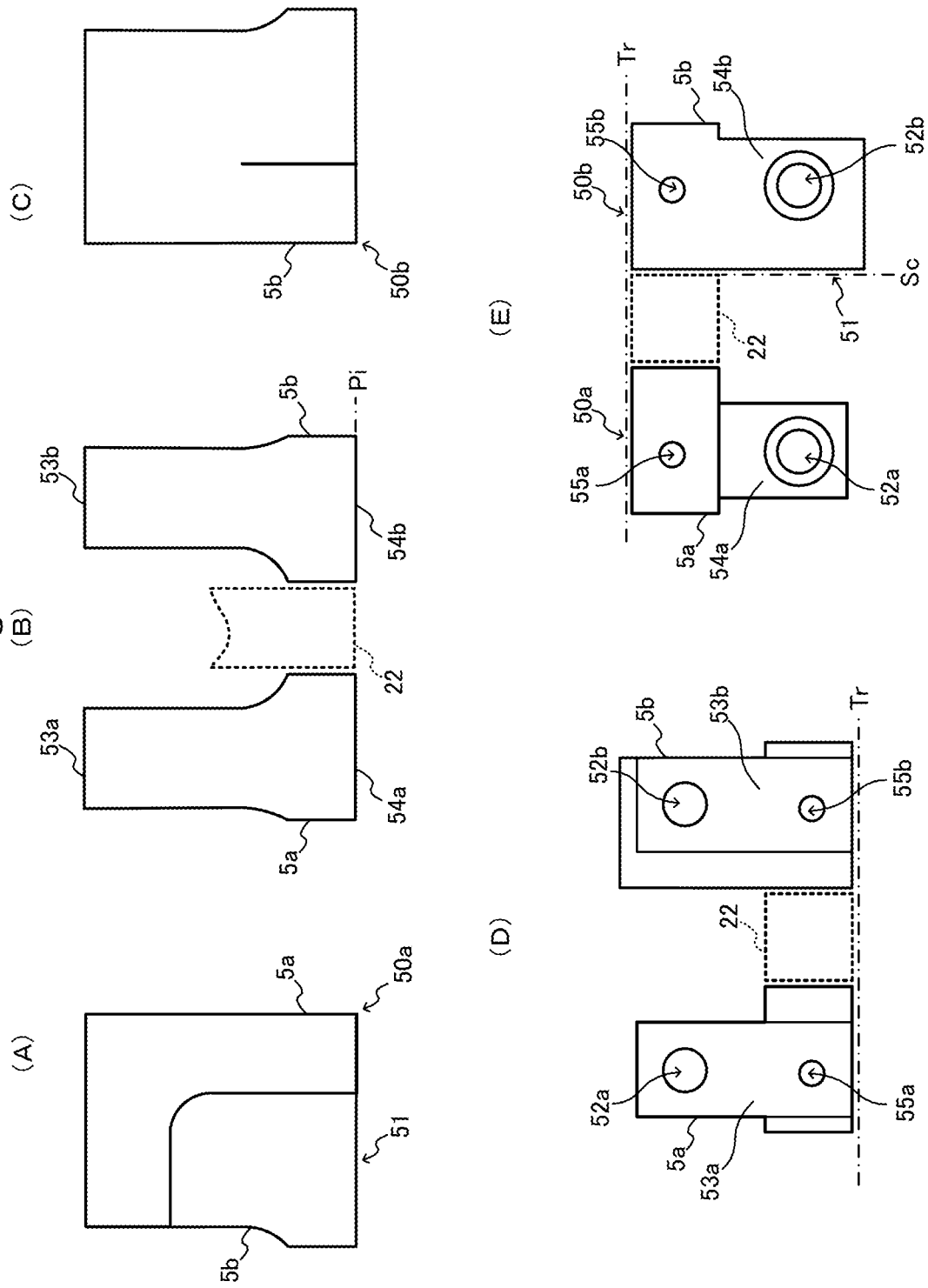
FIGS. 9(A)-9(E) are respectively a left side view, a front view, a right side view, a top view, and a bottom view of a pair of cutters 5a and 5b.

FIGS. 3(A)-3(D) are respectively a top view, a front view, a side view, and a bottom view of the floating cutter 2, and FIG. 3(E) is a B-B cross-section view of the floating cutter 2 shown in FIG. 3(B).

As shown in the figures, the floating cutter 2 comprises: a shank part 21 of a circular cylindrical shape; and a cutting part 22 of a prismatic shape, which is formed integrally with the shank part 21 so as to join to one end 213 of the shank part 21. In the cutting part 22, cutting edges 223 are formed by intersection lines of a cutting surface 221 on one end 224 of the cutting part 22 and respective cutting surfaces 222 of the side surfaces of the cutting part 22. On the outer circumference of the other end (the end on the opposite side to the end 213 with which the cutting part 22 is formed integrally: hereinafter, referred to as the tail end surface) 212 of the shank part 21, a disk-shaped flange part 23 protruding outwardly in the radial direction is formed. In a part of the outer peripheral surface 231 of the disk-shaped flange part 23, a flat-surface cutout 232, which has predetermined positional relations with the cutting edges 223, is formed. This cutout 232 comes in contact with a side surface 331 of the rotation lock 33 that is received in the cutter holder 31 (i.e. in the below-described rotation lock groove 314) (See FIG. 2(C)), so as to position the cutting edges 223 in relation to the holder set 3 and to prevent rotation of the floating cutter 2 about the axial center O in relation to the holder set 3. The shape of the cutout 232 is not limited to the flat surface shape shown in the figure, and may be any shape that can prevent rotation according to the shape of the rotation lock 33.

FIGS. 4(A) and 4(B) are respectively a top view and a bottom view of the cutter holder 31, FIG. 4(C) is a C-C cross-section view of the cutter holder 31 shown in FIG. 4(A).

As shown in the figures, in the cutter holder 31, bolt holes 311a and 311b, into which fixing bolts (not shown) are inserted, are formed, and a cutter through-hole 312 for inserting the floating cutter 2 is formed in the direction (the direction of the axial center O) that penetrates between the upper surface 315 as the one end surface and the bottom surface 316 as the other end surface. The cutter through-hole 312 has the inner diameter r2 that is larger than the outer diameter (r1 in FIG. 3(A)) of the flange part 23 of the floating cutter 2. The bush 34 for holding the floating cutter 2 movably in the direction of the axial center O is fitted into the inside of the cutter through-hole 312. Further, on the side of one end (on the side of the upper surface 315) of the inner wall surface 313 of the cutter through-hole 312, a rotation lock groove 314 having a concave shape opened on the side of the upper surface 315 is formed, so that the rotation lock 33 is received in the rotation lock groove 314.

Further, in the cutter holder 31, knock holes 317a and 317b are formed in the direction (the direction of the axial center O) that penetrates between the upper surface 315 as the one end surface and the bottom surface 316 as the other end surface. In the knock holes 317a and 317b, knock pins (not shown) for positioning the floating cutter 2, which are inserted in the bush 34 in the cutter through-hole 312 in relation to the trimming press processing device, are inserted.

FIGS. 5(A) and 5(B) are respectively a front view and a top view of the bush 34, and FIG. 5(C) is a D-D cross-section view of the bush 34 shown in FIG. 5(A).

As shown in the figures, the bush 34 has the length h1 at least shorter than the depth h2 of the cutter through-hole 312 of the cutter holder 31 by the depth h3 of the rotation lock groove 314. The bush 34 is fitted in the cutter through-hole 312 of the cutter holder 34 and fixed at a position where both the end surfaces 343 and 344 of the bush 34 do not protrude from the cutter through-hole 312 of the holder 31 in the direction of the axial center O.

In this state, when the shank part 21 of the floating cutter 2 is inserted into the bush 34, the flange part 23 of the floating cutter 2 abuts against one end surface 344 of the bush 34 within the cutter through-hole 312 of the cutter holder 31 so as to prevent falling of the floating cutter 2 out of the cutter through-hole 312 of the cutter holder 31 (See FIG. 2(C)). At this time, for smooth insertion of the floating cutter 2, a sliding surface 345, which comes in sliding contact with the outer peripheral surface 211 of the shank part 21 of the floating cutter 2, is formed in the inner peripheral surface 341 of the bush 34.

In detail, in the inner peripheral surface 341 of the bush 34, a sliding layer 342 is formed as a sliding part. As this sliding layer 342, for example, a porous sintered alloy layer is used. The porous sintered alloy layer is obtained by dispersing solid lubricant such as graphite into copper ally or the like, sintering this copper alloy or the like, and then subjecting the sintered copper alloy or the like to oil impregnation treatment. As such a bush 34, it is possible to mention, for example, Oiles #2000 produced by Oiles Corporation. Oiles #2000 has dual structure of a metal pipe and a sliding layer formed in the inside of the metal pipe, and is formed by pressing a cylindrical green compact including 4-10% of tin, 10-40% of nickel, 0.5-4% of phosphorus, and 3-10% of graphite by weight percent, and including copper as the balance, into a pipe formed of one of iron, iron alloy, copper, and copper alloy, and by sintering the pipe and the green compact. Instead of the sliding layer 342, the sliding part may be formed for example by embedding solid lubricant such as graphite in the bush 34 such that the embedded solid lubricant is exposed on the inner peripheral surface 341 of the bush 34. As such a bush 34, it is possible to mention Oiles #500 produced by Oiles Corporation.

Here, the outer diameter (r5 in FIG. 3(B)) of the shank part 21 of the floating cutter 2 is finished with zero or plus tolerance from the reference dimension, and the inner diameter (r6 in FIG. 5(C)) of the bush 34 into which the shank part 21 is inserted is finished with zero or minus tolerance from the reference dimension. Although thereby the clearance between the outer diameter r5 of the shank part 21 of the floating cutter 2 and the inner diameter r6 of the bush 34 becomes zero or minus clearance, the shank part 21 of the floating cutter 2 is smoothly inserted into the bush 34 without causing scoring because the bush 34 is provided with the sliding layer 342. Also at the time of scrap dividing processing, smooth movement is realized without causing scoring.

FIGS. 6(A), 6(B), and 6(C) are respectively a front view, a side view, and a top view of the rotation lock 33.

As shown in the figures, the rotation lock 33 has the height h4 shorter than the depth h3 of the rotation lock groove 314 of the cutter holder 31 (See FIG. 4(C)), and is inserted into the rotation lock groove 314 from the side of the upper surface 315 of the cutter holder 31 so as to be received in the rotation lock groove 314. Further, the rotation lock 33 has the thickness t so that, in the state that the rotation lock 33 is received in the rotation lock groove 314, the side surface 331 facing inward in the radial direction comes in contact with the cutout 232 of the flange part 23 of the floating cutter 2 inserted in the cutter through-hole 312 of the cutter holder 31. This prevents rotation of the floating cutter 2 about the axial center O in relation to the holder set 3. Here, in addition to the rotation locking function, the rotation lock 33 may be given a function to assist sliding in the direction of the axial center O by forming at least in the side surface 331 of the rotation lock 33 a sliding surface similar to the sliding surface 345 formed in the inner peripheral surface 341 of the bush 34.

FIG. 7(A) is a top view of the spring holder 32, and FIG. 7(B) is an E-E cross-section view of the spring holder 32 shown in FIG. 7(A).

As shown in the figures, in the spring holder 32, bolt holes 321a and 321b are formed so as to connect respectively with the bolt holes 311a and 311b of the cutter holder 31 in a state that the spring holder 32 is superposed on the upper surface 315 of the cutter holder 31. Into the bolt holes 321a and 321b, the respective fixing bolts (not shown) that are inserted into the bolt holes 311a and 311b of the cutter holder 31 are inserted. In a spring through-hole 322, the spring 4 arranged coaxially with the floating cutter 2 inserted in the cutter through-hole 312 of the cutter holder 31 is inserted. This spring through-hole 322 is a stepped hole (r3<r4) having a larger diameter on the side of one (back) surface (the surface to be superposed on the upper surface 315 of the cutter holder 31) 326 than on the side of the other (front) surface (the surface on the side of the upper die attachment plate of the trimming press processing device) 325, and receives a flange part 441 (See FIG. 8) of the spring 4 in a large diameter part 3221.

Further, in the spring holder 32, knock holes 327a and 327b are formed to connect respectively with the knock holes 317a and 317b of the cutter holder 31 in a state that the spring holder 32 is superposed on the upper surface 315 of the cutter holder 31. Into the knock holes 327a and 327b, the knock pins (not shown) that are inserted into the knock holes 317a and 317b of the cutter holder 31 are inserted, respectively.

FIGS. 8(A) and 8(B) are respectively a top view and a front view of the spring 4, and FIG. 8(C) is a F-F cross-section view of the spring 4 shown in FIG. 8(A).

As shown in the figures, the spring 4 comprises: a circular cylinder 41, which is filled with compressible fluid 45 such as silicone oil; a piston 42, which reciprocates in the direction of the axial center O (a direction and β direction) within the cylinder 41; a piston rod 43, one end 431 of which is connected to the piston 42 and the other end 432 of which abuts against the tail end surface 212 of the floating cutter 2; a cover 44, which seals the compressible fluid 45 such as silicone oil within the cylinder 41 and holds the piston rod 43 slidably; and a seal material (not shown) or the like, which is interposed between the outer peripheral surface 433 of the piston rod 43 and the inner peripheral surface 443 of a through-hole 442 of the cover 44.

In the cover 44, the flange part 441 is formed to protrude from the outer periphery. The outer periphery of the flange part 441 is formed by a pair of opposed flat surfaces 4411 and a pair of opposed curved surfaces 4412. The pair of curved surfaces 4412 protrude from the outer periphery of the cover 44, and the distance r7 between the curved surfaces 4412 is larger than the diameter r3 of the spring through-hole 322 of the spring holder 32. Accordingly, the flange part 441 engages with the large diameter part 3221 of the spring holder 32, to prevent falling of the spring 4 out of the spring holder 32.

Owing to the above-described configuration, when force of less than a predetermined value is applied to the floating cutter 2 in the direction (upward direction α) from the bottom surface 316 toward the upper surface 315 of the cutter holder 31, movement of the piston 42 in the upward direction α is prevented owing to the resistance of the compressible fluid 45 within the cylinder 41, and therefore the floating cutter 2 does not move in relation to the cutter holder 31. On the other hand, when force of larger than or equal to the predetermined value is applied to the floating cutter 2 in the upward direction α, the piston 42 moves in the upward direction α owing to the compressible fluid 45 within the cylinder 41, and therefore the floating cutter 2 moves in the upward direction α in relation to the cutter holder 31.

When the force of larger than or equal to the predetermined value is removed, the floating cutter 2 returns to the initial position Pi (See FIG. 1) owing to the restoring force of the compressible fluid 45. The restoring force of the compressible fluid 45 is set to be larger than the holding force (fixing force owing to the interference range of the bush 34 and the shank part 21 of the floating cutter 2, and the frictional force between the sliding surface 345 of the bush 34 and the outer peripheral surface 211 of the shank part 21 of the floating cutter 2) of the cutter holder 31 for holding the floating cutter 2, and thereby it is possible to return the floating cutter 2 certainly to the initial position Pi.

The present embodiment uses the spring 4 that applies the compressible fluid 45. However, instead of the compressible fluid 45, it is possible to use gas such as nitrogen gas or an elastic body such as a coil spring.

FIGS. 9(A)-9(E) are respectively a left side view, a front view, a right side view, a top view, and a bottom view of a pair of cutters 5a and 5b.

Figure 10:
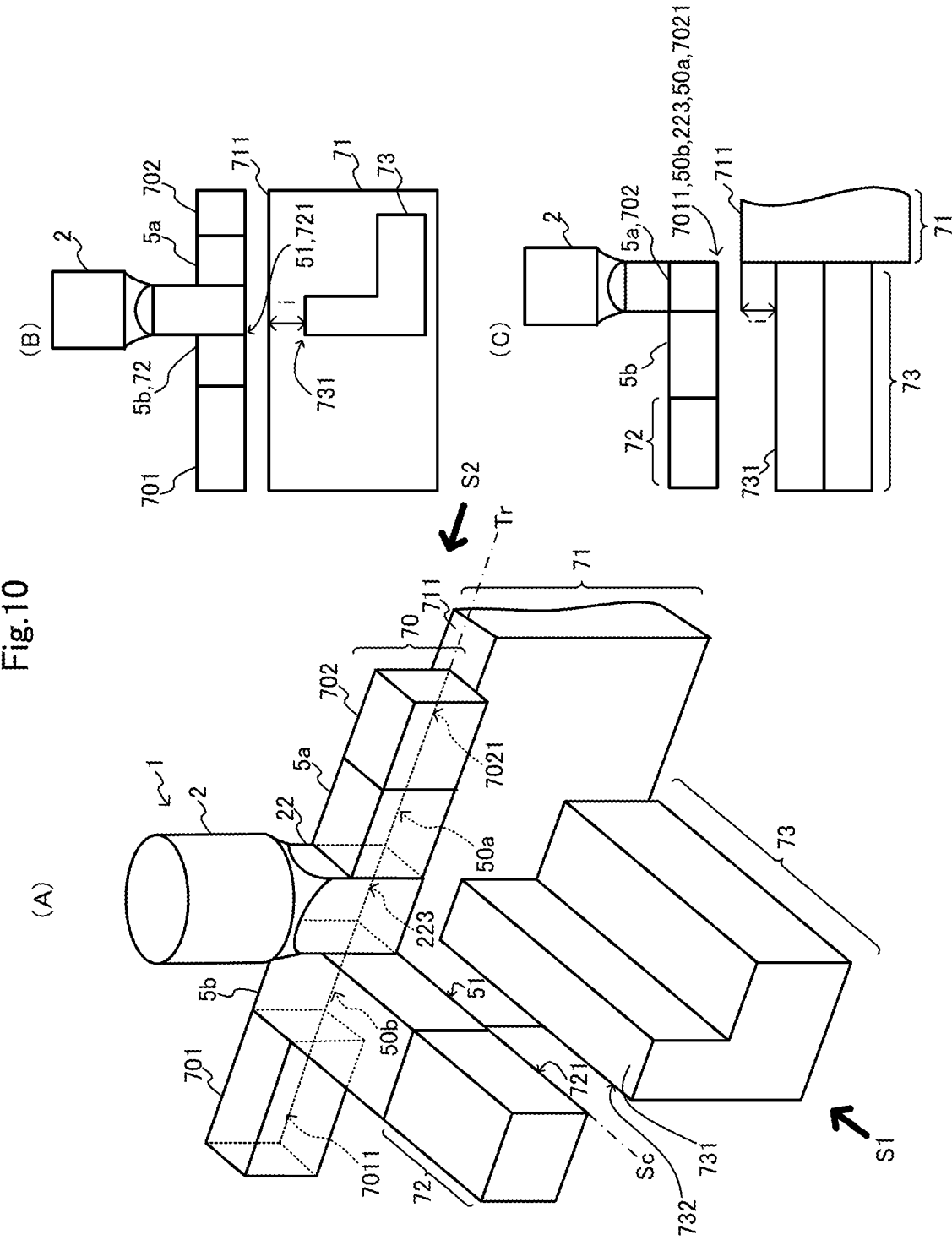
FIG. 10(A) is a perspective view showing a schematic configuration of a die part of a trimming press processing device using the floating cutter unit 1 of the one embodiment of the present invention.
FIGS. 10(B) and 10(C) are views of the trimming press processing device shown in FIG. 10(A) respectively seen in the directions of the arrows S1 and S2.

As shown in the figures, the pair of cutters 5a and 5b are arranged both sides of the cutting part 22 of the floating cutter 2 along to the trim line Tr, and have cutting edges 50*a* and 50*b*, which form a cutting tooth along the trim line Tr together with the cutting edge 223 of the cutting part 22 of the floating cutter 2 positioned on the initial position Pi and cutting edges 7011 and 7021 of main trimming press upper dies 701 and 702 (See FIG. 10).

Further, the cutter 5*b* has a cutting edge 51, which forms a cutting tooth along the scrap cut line Sc together with a cutting edge 721 of the scrap cutting press upper die 72 (See FIG. 10). Namely, the cutter 5*b* is formed integrally with a scrap cutter having the cutting edge 51, which forms the cutting tooth along the scrap cut line Sc together with the cutting edge 721 of the scrap cutting press upper die 72.

In the pair of cutters 5*a* and 5*b*, bolt holes 52*a* and 52*b* are formed. The bolt holes 52*a* and 52*b* connect with the bolt holes 311*a* and 311*b* of the cutter holder 31 in a state that the pair of cutters 5*a* and 5*b* are superposed on the bottom surface 316 of the cutter holder 31 such that the pair of cutters 5*a* and 5*b* are arranged both sides of the cutting part 22 of the floating cutter 2 along to the trim line Tr. The bolt holes 52*a*, 52*b* are stepped holes in such a way that the diameters of the bolt holes 52*a* and 52*b* on the side of the bottom surfaces 54*a* and 54*b* of the cutters 5*a* and 5*b* are larger than the diameters of the bolt holes 54*a* and 54*b* on the side of the upper surfaces 53*a* and 53*b* of the cutters 5*a* and 5*b*, so that the heads of inserted fixing bolts are received on the side of the bottom surface 54*a* and 54*b*.

Further, in the pair of cutters 5*a* and 5*b*, knock holes 55*a* and 55*b* are formed. The knock holes 55*a* and 55*b* connect with the knock holes 317*a* and 317*b* of the cutter holder 31 in a state that the pair of cutters 5*a* and 5*b* are superposed on the bottom surface 316 of the cutter holder 31 such that the pair of cutters 5*a* and 5*b* are arranged both sides of the cutting part 22 of the floating cutter 2 along to the trim line Tr. Into the knock holes 55*a* and 55*b*, knock pins (not shown) inserted in the knock holes 317*a* and 317*b* of the cutter holder 31 are inserted.

Next, an example of an assembly procedure of the floating cutter unit 1 of the present embodiment and a fixing procedure of the floating cutter unit 1 to the trimming press processing device will be described.

First, the bush 34 is fitted into and fixed to the cutter through-hole 312 of the cutter holder 31, and the rotation lock 33 is inserted into the rotation lock groove 314 of the cutter holder 31 from the side of the upper surface 315 of the cutter holder 31.

Next, the floating cutter 2 is inserted into the cutter through-hole 312 of the cutter holder 31 from the side of the cutting part 22 while making the cutout 232 of the flange part 23 face toward the side surface 331 of the rotation lock 33. Then the shank part 21 of the floating cutter 2 is inserted into the bush 34 until the flange part 23 of the floating cutter 2 abut against the one end surface 344 of the bush 34 in the inside of the cutter through-hole 312 of the cutter holder 31. At this time, although the clearance between the outer diameter r5 of the shank part 21 of the floating cutter 2 and the inner diameter r6 of the bush 34 is zero or minus clearance as described above, the shank part 21 of the floating cutter 2 is smoothly inserted into the bush 34 without causing scoring owing to the sliding layer 342 of the bush 34. Then, the cutout 232 of the flange part 23 of the floating cutter 2 is brought into contact with the side surface 331 of the rotation lock 33 in the inside of the cutter through-hole 312 of the cutter holder 31.

Next, the spring 4 is placed on the side of the tail end surface 212 of the floating cutter 2 so that the other end 432 of the piston rod 43 comes in contact with the tail end surface 212 of the floating cutter 2.

Then, the spring holder 32 is overlaid on the upper surface 315 of the cutter holder 31 so that the cylinder 41 of the spring 4 is inserted into the spring through-hole 322. Thereby, the spring 4 is positioned in relation to the floating cutter 2 in such a way that the other end 432 of the piston rod 43 abuts against the tail end surface 212 of the floating cutter 2 on the axial center O of the floating cutter 2 (that is to say, the piston rod 43 is positioned coaxially with the floating cutter 2).

Next, knock pins are inserted into the knock holes 317*a* and 317*b* of the cutter holder 31, so as to expose the respective front ends of the knock pins from the knock holes 327*a* and 327*b* of the spring holder 32 and to expose the respective back ends of the knock pins from the knock holes 317*a* and 317*b* of the cutter holder 31. Then, the back ends of the knock pins exposed from the knock hole 317*a* and 317*b* of the cutter holder 31 are inserted into the knock holes 55*a* and 55*b* of the pair of cutters 5*a* and 5*b* from the side of the upper surfaces 53*a* and 53*b* of the pair of cutters 5*a* and 5*b*. And the pair of cutters 5*a* and 5*b* are arranged on the bottom surface 316 of the cutter holder 31, such that the pair of cutters 5*a* and 5*b* are arranged both sides of the cutting part 22 of the floating cutter 2 along to the trim line Tr.

Then, the front end of the knock pins exposed from the knock holes 327*a* and 327*b* of the spring holder 32 are inserted into respective corresponding knock holes provided with the upper die attachment plate of the trimming press processing device. By this, the floating cutter 2 and the pair of cutters 5*a* and 5*b* held by the holder set 3 are positioned in relation to the trimming press processing device.

As described above, when the floating cutter 2 and the pair of cutters 5*a* and 5*b* held by the holder set 3 are positioned in relation to the trimming press processing device, fixing bolts are respectively inserted into the bolt holes 52*a* and 52*b* of the pair of cutters 5*a* and 5*b*, so as to protrude threaded parts of the fixing bolts from the bolt holes 321*a* and 321*b* of the spring holder 32 via the bolt holes 311*a* and 311*b* of the cutter holder 31. Then the exposed threaded parts of the fixing bolts are respectively screwed into screw holes provided in the upper die attachment plate of the trimming press processing device. Thereby, the floating cutter unit 1 is mounted on the trimming press processing device.

Next, trimming press processing by the trimming press processing device using the floating cutter unit 1 of the present embodiment will be described.

FIG. 10(A) is a perspective view showing a schematic configuration of a die part of the trimming press processing device using the floating cutter unit 1 of the present embodiment, and FIGS. 10(B) and 10(C) are views of the trimming press processing device shown in FIG. 10(A) respectively seen in the directions of the arrows S1 and S2.

As shown in the figures, the trimming press processing device comprises: trimming press upper and lower dies 70 and 71, which cut off a scrap other than the product part from a plate material along the trim line Tr; scrap cutting press upper and lower dies 72 and 73, which further divide the cut-off scrap along the scrap cut line Sc; the upper die attachment plate (not shown), to which the trimming press upper die 70 and the scrap cutting press upper die 72 are fixed; and a ram (not shown), which makes the trimming press upper die 70 and the scrap cutting press upper die 72 (the upper die attachment plate) move up and down in relation to the trimming press lower die 71 and the scrap cutting press lower die 73.

The trimming press upper die 70 comprises: a plurality of main trimming press upper dies 701 and 702, which move up and down in relation to the trimming press lower die 71; and the floating cutter unit 1, which moves up and down together with the main trimming press upper dies 701 and 702.

The floating cutter unit 1 is placed between the main trimming press upper dies 701 and 702. Thereby, the cutting edge 223 of the cutting part 22 opposed to the trimming press lower die 71 and the cutting edges 50*a* and 50*b* of the pair of cutters 5*a* and 5*b* form the cutting tooth along the trim line Tr together with the cutting edges 7011 and 7021 of the main trimming press upper dies 701 and 702. Further, the cutting edge 51 of the cutter 5*b* forms the cutting tooth along the scrap cut line Sc together with the cutting edge 721 of the scrap cutting press upper die 72.

An upper cutting surface 731 of the scrap cutting press lower die 73 is positioned below an upper cutting surface 711 of the trimming press lower die 71, and there is a distance i larger than the plate thickness of the plate material between these upper cutting surfaces 731 and 711.

Although for the sake of simplicity FIG. 10 shows a case of two main trimming press upper dies 701 and 702 and one floating cutter unit 1, a suitably-determined number of main trimming press upper dies and a suitably-determined number of floating cutter units 1 are used in practice.

FIGS. 11(A)-11(D) are views for explaining trimming press processing by the trimming press processing device that uses the floating cutter unit 1 of the present embodiment. Here, FIGS. 11(A) and 11(B) correspond to FIG. 10(C) seen in the direction of the arrow S2, and FIGS. 11(C) and 11(D) correspond to FIG. 10(B) seen in the direction of the arrow S1.

Figure 11:
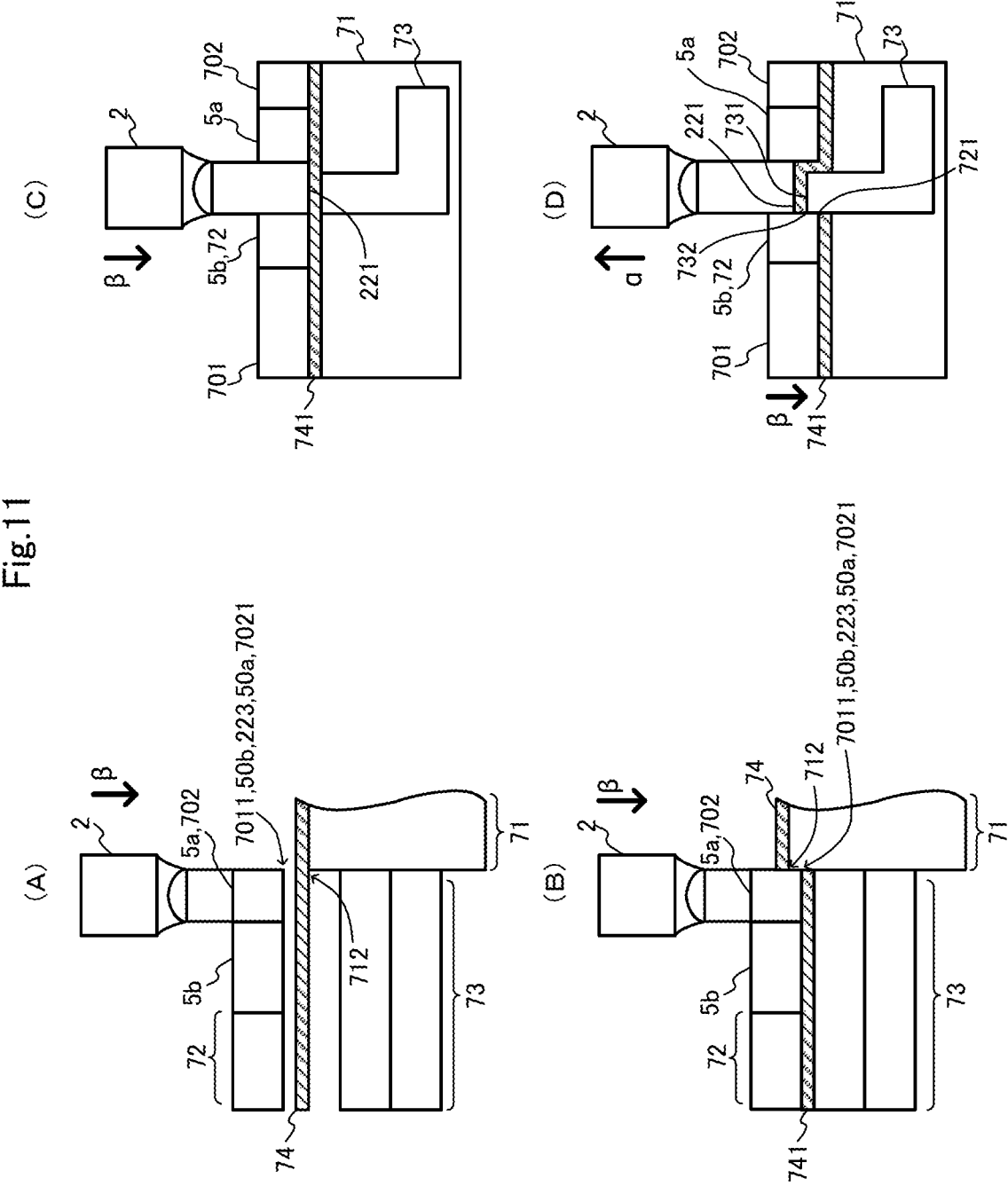
FIGS. 11(A)-11(D) are views for explaining trimming press processing by the trimming press processing device that uses the floating cutter unit 1 of the one embodiment of the present invention.

As shown in FIG. 11(A), when the plate material 74 is set on the trimming press lower die 71, the main trimming press upper dies 701 and 702, the floating cutter unit 1, and the scrap cutting press upper die 72 are driven by the ram and start moving down in the direction β toward the trimming press lower die 71.

Then, as shown in FIG. 11(B), by the cutting edges 7011 and 7021 of the main trimming press upper dies 701 and 702, the cutting edge 223 of the floating cutter 2, the cutting edges 50*a* and 50*b* of the pair of cutters 5*a* and 5*b*, and the cutting edge 712 of the trimming press lower die 71, a scrap 741 other than the product part is cut off from the plate material 74 along the trim line Tr. At this time, since the piston 42 is prevented from moving by the resistance of the compressible fluid 45 in the cylinder 41, the floating cutter 2 does not move in relation to the cutter holder 31. Thereby, the cutting edge 223 of the floating cutter 2, together with the cutting edges 50*a* and 50*b* of the pair of cutters 5*a* and 5*b*, moves synchronously with the cutting edges 7011 and 7021 of the main trimming press upper dies 701 and 702.

Thereafter, as shown in FIG. 11(C), the main trimming press upper dies 701 and 702, the floating cutter unit 1, and the scrap cutting press upper die 72 continue moving down in the direction β. Thereby, when the cutting surface 221 at the end of the floating cutter 2 is pressed against the scrap cutting press lower die 73 via the scrap 741, the piston 42 moves in the upward direction a owing to the compressible fluid 45 in the cylinder 41 as shown in FIG. 11(D). Then the floating cutter 2 moves upward in the direction α in relation to the cutter holder 31. On the other hand, the pair of cutters 5*a* and 5*b* continues moving down synchronously with the main trimming press upper dies 701 and 702 and the scrap cutting press upper die 72. Thereby, the scrap 741 is divided by the cutting edge 721 of the scrap cutting press upper die 72, the cutting edge 51 of the cutter 5*b* and the cutting edge 732 of the scrap cutting press lower die 73 along the scrap cut line Sc.

Hereinabove, one embodiment of the present invention has been described.

In the present embodiment, the pair of cutters 5*a* and 5*b*, which are positioned on both sides of the floating cutter 2 along to the trim line Tr, are attached to the holder set 3 that holds the floating cutter 2 movably in the direction of the axial center O. By this, a gap between the floating cutter 2 and the pair of cutters 5*a* and 5*b* is not influenced by an error in the mounting position of the main trimming press upper dies 701 and 702 and the floating cutter unit 1 to the trimming press processing device. Thus, it is possible to set the gap between the floating cutter 2 and the pair of cutters 5*a* and 5*b* with a high degree of accuracy (including zero gap). Further, since the pair of cutters 5*a* and 5*b* are attached to the holder set 3, the pair of cutters 5*a* and 5*b* do not move in the direction of an axial center O in relation to the main trimming press upper dies 701 and 702. By this, scoring between the pair of cutters 5*a* and 5*b* and the main trimming press upper dies 701 and 702 does not occur. Therefore, according to the present embodiment, it is possible to obtain a fine finish along the trim line Tr in the plate material 74 while preventing scoring between the floating cutter unit 1 and the main trimming press upper dies 701 and 702.

In addition, according to the present embodiment, a material different from the material for the main trimming press upper dies 701 and 702 can be selected as the material for the pair of cutters 5*a* and 5*b*. By this, compared to the material of the main trimming press upper dies 701 and 702, by selecting a high hardness metal, which has high resistance to metal contact with the floating cutter 2, as the material of the pair of cutters 5*a* and 5*b*, the gap between the floating cutter 2 and the pair of cutters 5*a* and 5*b* can be set narrower (including zero gap). Therefore, it is possible to obtain a more fine finish along the trim line Tr in the plate material 74 while preventing scoring between the floating cutter unit 1 and the main trimming press upper dies 701 and 702.

Further, in the present embodiment, fixed blades positioned on both sides of the floating cutter 2 along the trim line Tr are the cutters 5*a* and 5*b* attached to the holder set 3. Thus, as compared with the case where the fixed blades located on both sides of the floating cutter 2 along the trim line Tr are the main trimming press upper dies 701 and 702, the overhang (X portion in FIG. 1) of the fixed blade can be shortened. By this, since the strength of the fixed blades are improved and the bending of the overhang portion of the fixed blades is reduced, the plate material 74 can be finished more fine along the trim line Tr.

The present invention is not limited to the above-described embodiment, and can be varied in many ways within the scope of the invention.

For example, in the above embodiment, the scrap cutter, which forms the cutting tooth along the scrap cut line Sc together with the cutting edge 721 of the scrap cutting press upper die 72 is formed integrally with the cutter 5*b* by providing the cutting edge 51 with the cutter 5*b*. The present invention, however, is not limited to this. A scrap cutter provided separately from the cutter 5*b* may be attached to the holder set 3.

Further, in the above embodiment, the cutting edge 51 of the scrap cutter, which is formed integrally with or separately from the cutter 5*b*, may be extended along to the scrap cut line Sc so as to omit the scrap cutting press upper die 72.

By this, it is possible to simplify the installing operation of dies in the trimming press processing device.

Further, in the above embodiment, the cutters 5a and 5b positioned on both sides of the floating cutter 2 along the trim line Tr are separated. However, the cutters 5a and 5b may be formed integrally.

Further, in the above embodiment, a guide member for guiding the movement of the floating cutter 2 in the direction of the axis center O may be attached to the holder set 3.

FIGS. 12(A), 12(B), and 12(C) are respectively a left side view, a front view, and a right side view of a floating cutter unit 1' as a variation of the floating cutter unit 1 of the present embodiment. Further, FIGS. 13(A) and 13(B) are respectively a top view and a bottom view of the floating cutter unit 1' as the variation of the floating cutter unit 1 of the present embodiment, and FIG. 13(C) is a G-G cross-section view of the floating cutter unit 1' as the variation of the floating cutter unit 1 shown in FIG. 12(B).

Figure 12:
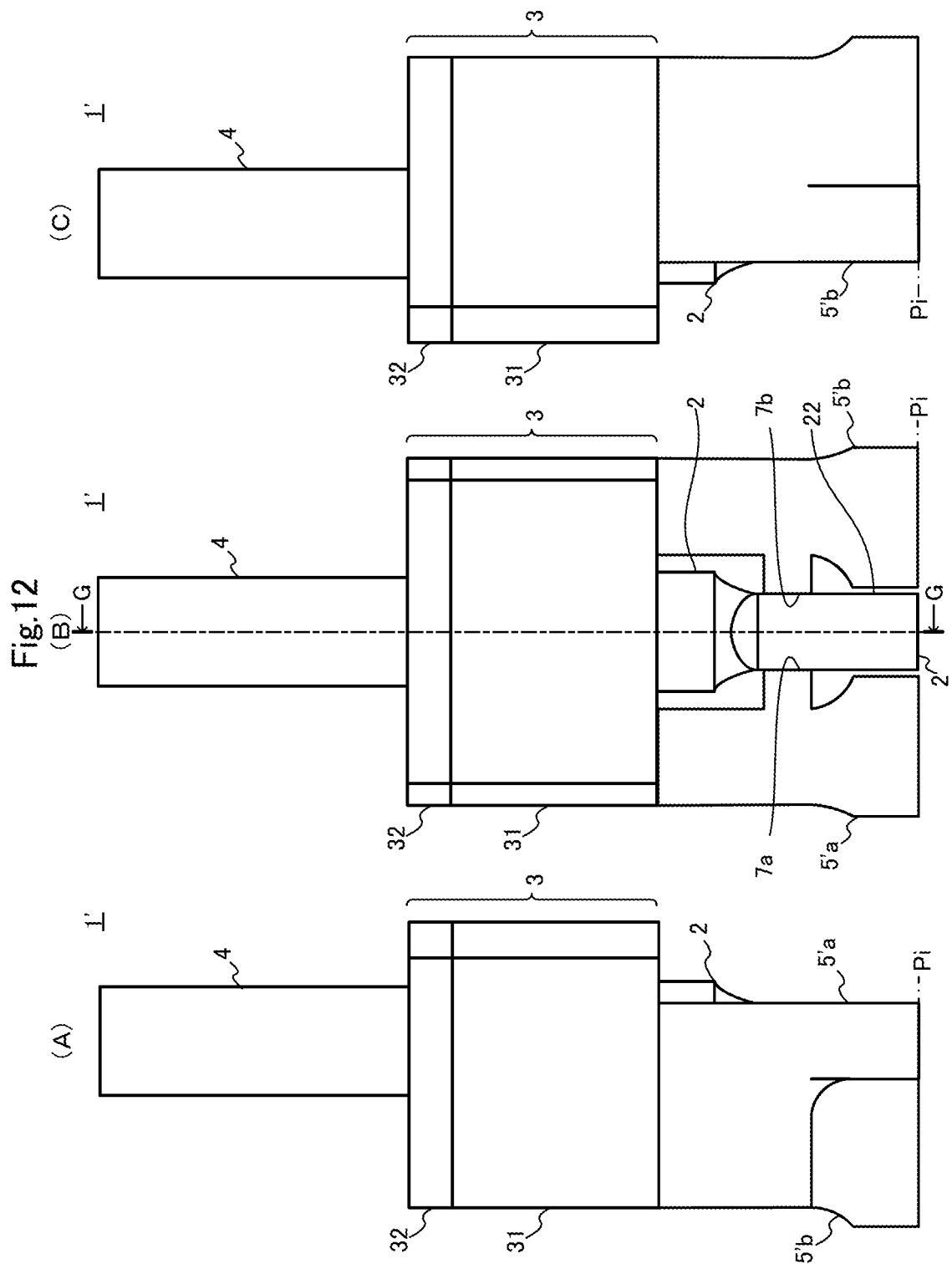
FIGS. 12(A), 12(B), and 12(C) are respectively a left side view, a front view, and a right side view of a floating cutter unit 1' as a variation of the floating cutter unit 1 of the one embodiment of the present invention.

The floating cutter unit 1' as the variation of the floating cutter unit 1 shown in FIG. 12 and FIG. 13 is different from the floating cutter unit 1 of the present embodiment shown in FIG. 1 and FIG. 2 in that cutters 5'a and 5'b are used instead of the cutters 5a and 5b, and a connecting portion 6 that connects the cutters 5'a and 5'b is provided. The other configuration of the floating cutter unit 1' is similar to the floating cutter unit 1 of the present embodiment.

The cutters 5'a and 5'b are connected each other by the connecting portion 6 so as to be formed integrally, and are positioned on both sides of the floating cutter 2 along to the trim line Tr. Further, the cutters 5'a and 5'b have guide surfaces 7a and 7b, which sliding contact with side surfaces (side surfaces parallel to the scrap cut line Sc) of the cutting part 22 of the floating cutter 2. The other configuration of the cutters 5'a and 5'b is similar to the cutters 5a and 5b of the floating cutter unit 1 of the present embodiment.

The connecting portion 6 is arranged parallel to the trim line Tr so as to connect between the cutters 5'a and 5'b, and has guide surface 7c, which sliding contacts with a side surface (a side surface parallel to the trim line Tr) of the cutting part 22 of the floating cutter 2.

According to the floating cutter unit 1' as the variation of the floating cutter unit 1 of the present embodiment, which has the above configuration, movement of the floating cutter 2 in the direction of the axial center O is guided by the guide surfaces 7a-7c, which sliding contact with the side surfaces of the cutting part 22 of the floating cutter 2. Thus, it is possible to move the floating cutter 2 in the direction of the axial center O with a higher degree of accuracy. Accordingly, the plate material 74 can be finished more fine along the trim line Tr.

By the way, in the floating cutter unit 1' as the variation of the floating cutter unit 1 of the present embodiment shown in FIG. 12 and FIGS. 13, the three guide surfaces 7a-7c come in sliding contact with the side surfaces of the cutting part 22 of the floating cutter 2, so as to guide the movement of the floating cutter 2 in the direction of the axial center O. However, it is sufficient with at least one guide surface. Further, the guide surface may come in sliding contact with the shank part 21 of the floating cutter 2, so as to guide the movement of the floating cutter 2 in the direction of the axial center O.

Further, in the floating cutter unit 1' as the variation of the floating cutter unit 1 of the present embodiment shown in FIG. 12 and FIGS. 13, the three guide surfaces 7a-7c are provided on the cutters 5'a and 5'b and the connecting portion 6. However, guide surfaces may be provided on a separate member attached to the holder set 3.

Further, in the floating cutter unit 1' as the variation of the floating cutter unit 1 of the present embodiment shown in FIG. 12 and FIGS. 13, sliding layers may be formed on the guide surfaces 7a-7c. The sliding layers come in sliding contact with the side surfaces of the cutting part 22 of the floating cutter 2. By this arrangement, the guide surfaces 7a-7c and the side surfaces of the cutting part 22 of the floating cutter 2 can come in sliding contact with each other more smoothly. As the sliding layer, for example, a porous sintered alloy layer (above described Oiles #2000 produced by Oiles Corporation or the like) is used. The porous sintered alloy layer is obtained by dispersing solid lubricant such as graphite into copper alloy or the like, sintering this copper alloy or the like, and then subjecting the sintered copper alloy or the like to oil impregnation treatment. Instead of the sliding layer, solid lubricant such as graphite may be embedded in the guide surfaces 7a-7c so as to expose the solid lubricant on the guide surfaces 7a-7c (above described Oiles #500 produced by Oiles Corporation or the like).

REFERENCE SIGNS LIST 1, 1': floating cutter unit; 2: floating cutter; 3: holder set; 4: spring; 5a, 5'a, 5b, 5'b: cutter; 6: connecting portion; 7a, 7b, 7c: guide surface; 21: shank part of the floating cutter 2; 22: cutting part of the floating cutter 2; 23: flange part of the floating cutter 2; 31: cutter holder; 32: spring holder; 33: rotation lock; 34: bush; 41: cylinder; 42: piston; 43: piston rod; 44: cover; 45: compressible fluid; 50a, 50b: cutting edge of the cutter 5a, 5b; 51: cutting edge of the cutter 5b; 52a, 52b, 311a, 311b, 321a, 321b: bolt hole; 53a, 53b: upper surface of the cutter 5a, 5b; 54a, 54b: bottom surface of the cutter 5a, 5b; 55a, 55b, 317a, 317b, 327a, 327b: knock hole; 70: trimming press upper die; 71: trimming press lower die; 72: scrap cutting press upper die; 73: scrap cutting press lower die; 211: outer peripheral surface of the shank part 21; 212: end (tail end surface) of the floating cutter 2; 213: end of the shank part 21; 221, 222: cutting surface of the floating cutter 2; 223: cutting edge of the floating cutter 2; 231: outer peripheral surface of the flange part 23; 232: cutout of the flange part 23; 312: cutter through-hole; 313: inner wall surface of the cutter through-hole 312; 314: rotation lock groove of the holder 31; 315: upper surface of the holder 31; 316: bottom surface of the holder 31; 322: spring through-hole; 325: front surface of the spring holder 32; 326: back surface of the spring holder 32; 331: side surface of the rotation lock 33; 341: inner peripheral surface of the bush 34; 342: sliding layer of the bush 34; 343, 344: end surface of the bush 34; 345: sliding surface of the bush 34; 431, 432: end of the piston rod 43; 433: outer peripheral surface of the piston rod 43; 441: flange part of the cover 44; 442: through-hole of the cover 44; 443: inner peripheral surface of the through-hole 442; 701, 702: main trimming press upper die; 711: upper cutting surface of the trimming press lower die 71; 721: cutting edge of the scrap cutting press upper die 72; 731: upper cutting surface of the scrap cutting press lower die 73; 732: cutting edge of the scrap cutting press lower die 73; and 7011, 7021: cutting edge of the main trimming press upper die 701, 702.

The invention claimed is:

1. A trimming press processing device, comprising:
a trimming press lower die;
a main trimming press upper die configured to move toward the trimming press lower die to cut off a scrap other than a product part from a plate material between the main trimming press upper die and the trimming press lower die along a trim line;

a floating cutter unit configured to move together with the main trimming press upper die toward the trimming press lower die to cut off the scrap from the plate material between the trimming press lower die and the floating cutter unit together with the main trimming press upper die;

a scrap cutting press lower die positioned with a space from a cutting edge of the trimming press lower die at a distance corresponding to a plate thickness of the plate material in a direction of moving of the main trimming press upper die; and a scrap cutting press upper die, configured to move together with the main trimming press upper die to divide the scrap along a scrap cut line between the scrap cutting press upper die and the scrap cutting press lower die, wherein the floating cutter unit comprises:

a floating cutter aligned with the main trimming press upper die along the trim line to cut the scrap from the plate material together with the main trimming press upper die, a pair of cutters positioned between the main trimming press upper die and the floating cutter and formed of a metal with a greater hardness than the main trimming press upper die, the pair of cutters being aligned with the floating cutter and the main trimming press upper die along the trim line to cut the scrap from the plate material together with the floating cutter and the main trimming press upper die, a first one of the pair of cutters being positioned on a first side of the floating cutter and a second one of the pair of cutters being positioned on a second side of the floating cutter that is opposite the first side of the floating cutter, a holder set to which the pair of cutters are fixated, the holder set holding the floating cutter in a manner that allows the floating cutter to move and slide relative to the pair of cutters in a direction of an axial center of the floating cutter, and a fluid cylinder in contact with a tail end surface of the floating cutter to give a reaction force to the floating cutter, the fluid cylinder being configured to allow the floating cutter to move relative to the holder set in a direction opposite to the direction of moving the pair of cutters while pushing the floating cutter against the scrap cutting press lower die after cutting off the scrap, wherein the main trimming press upper die comprises a cutting edge configured to cut off the scrap, wherein the floating cutter comprises a cutting edge configured to cut off the scrap, and the pair of cutters each comprises a cutting edge configured to cut off the scrap, and wherein the cutting edges of the pair of cutters are formed of the metal with the greater hardness than the cutting edge of the main trimming press upper die.

2. The trimming press processing device of claim 1, wherein the floating cutter unit further comprises a scrap cutter attached to the holder set and arranged along the scrap cut line.

3. The trimming press processing device of claim 2, wherein the scrap cutter is formed integrally with one of the pair of cutters.

4. The trimming press processing device of claim 1, wherein the pair of cutters are integrally formed.

5. The trimming press processing device of claim 1, wherein the floating cutter unit further comprises a guide surface configured to guide movement of the floating cutter in the direction of the axial center of the floating cutter.

6. The trimming press processing device of claim 5, wherein the guide surface is formed integrally with at least one of the pair of cutters.

7. The trimming press processing device of claim 1, wherein the floating cutter unit is separate from the main trimming press upper die.

8. The trimming press processing device of claim 1, wherein the main trimming press upper die comprises a first main trimming press upper die part and a second main trimming press upper die part, wherein the said first one of the pair of cutters is positioned between the first main trimming press upper die part and the floating cutter, and wherein said second one of the pair of cutters is positioned between the second main trimming press upper die part and the floating cutter.

9. A trimming press processing device, comprising:

a trimming press lower die;

a main trimming press upper die configured to move toward the trimming press lower die to cut off a scrap other than a product part from a plate material between the main trimming press upper die and the trimming press lower die along a trim line;

a floating cutter unit configured to move together with the main trimming press upper die toward the trimming press lower die to cut off the scrap from the plate material between the trimming press lower die and the floating cutter unit together with the main trimming press upper die;

a scrap cutting press lower die positioned with a space from a cutting edge of the trimming press lower die at a distance corresponding to a plate thickness of the plate material in a direction of moving of the main trimming press upper die; and a scrap cutting press upper die, configured to move together with the main trimming press upper die to divide the scrap along a scrap cut line between the scrap cutting press upper die and the scrap cutting press lower die, wherein the floating cutter unit comprises:

a floating cutter aligned with the main trimming press upper die along the trim line to cut the scrap from the plate material together with the main trimming press upper die, a pair of cutters positioned between the main trimming press upper die and the floating cutter and formed of a metal with a greater hardness than the main trimming press upper die, the pair of cutters being aligned with the floating cutter and the main trimming press upper die along the trim line to cut the scrap from the plate material together with the floating cutter and the main trimming press upper die, a first one of the pair of cutters being positioned on a first side of the floating cutter and a second one of the pair of cutters being positioned on a second side of the floating cutter that is opposite the first side of the floating cutter, a holder set to which the pair of cutters are fixated, the holder set holding the floating cutter in a manner that allows the floating cutter to move and slide relative to the pair of cutters in a direction of an axial center of the floating cutter, and a fluid cylinder in contact with a tail end surface of the floating cutter to give a reaction force to the floating cutter, the fluid cylinder being configured to allow the floating cutter to move relative to the holder set in a direction opposite to the direction of moving the pair of cutters while pushing the floating cutter against the scrap cutting press lower die after cutting off the scrap, wherein the entirety of the pair of cutters is formed of the metal with the greater hardness than the entirety of the main trimming press upper die.

10. The trimming press processing device of claim 9, wherein the floating cutter unit further comprises a scrap cutter attached to the holder set and arranged along the scrap cut line.

11. The trimming press processing device of claim 10, wherein the scrap cutter is formed integrally with one of the pair of cutters.

12. The trimming press processing device of claim 9, wherein the pair of cutters are integrally formed.

13. The trimming press processing device of claim 9, wherein the floating cutter unit further comprises a guide surface configured to guide movement of the floating cutter in the direction of the axial center of the floating cutter.

14. The trimming press processing device of claim 13, wherein the guide surface is formed integrally with at least one of the pair of cutters.

15. The trimming press processing device of claim 9, wherein the floating cutter unit is separate from the main trimming press upper die.

16. The trimming press processing device of claim 9, wherein the main trimming press upper die comprises a first main trimming press upper die part and a second main trimming press upper die part, wherein the said first one of the pair of cutters is positioned between the first main trimming press upper die part and the floating cutter, and wherein said second one of the pair of cutters is positioned between the second main trimming press upper die part and the floating cutter.

* * * * *